(12) United States Patent
Donaldson et al.

(10) Patent No.: US 11,375,734 B2
(45) Date of Patent: Jul. 5, 2022

(54) UTILIZATION OF OLEAGINOUS MICROORGANISMS AS AN ORAL SUPPLEMENT FOR ANIMALS

(71) Applicants: Mississippi State University, Mississippi State, MS (US); The United States of America, as Represented by the Secretary of Agriculture, Washington, DC (US)

(72) Inventors: Janet R. Donaldson, Purvis, MS (US); Jeffrey A. Carroll, Wolfforth, TX (US)

(73) Assignees: Mississippi State University, Mississippi State, MS (US); The United States of America, as Represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 15/568,364

(22) PCT Filed: Apr. 21, 2016

(86) PCT No.: PCT/US2016/028696
§ 371 (c)(1),
(2) Date: Oct. 20, 2017

(87) PCT Pub. No.: WO2016/172374
PCT Pub. Date: Oct. 27, 2016

(65) Prior Publication Data
US 2018/0325142 A1 Nov. 15, 2018

Related U.S. Application Data

(60) Provisional application No. 62/178,871, filed on Apr. 21, 2016.

(51) Int. Cl.
| | |
|---|---|
| *A23K 10/18* | (2016.01) |
| *A23L 33/135* | (2016.01) |
| *A23K 10/16* | (2016.01) |
| *A23K 50/30* | (2016.01) |
| *A23K 50/75* | (2016.01) |
| *A23L 33/12* | (2016.01) |
| *A23L 33/14* | (2016.01) |
| *A23L 31/10* | (2016.01) |

(52) U.S. Cl.
CPC ............ *A23K 10/18* (2016.05); *A23K 10/16* (2016.05); *A23L 33/135* (2016.08); *A23K 50/30* (2016.05); *A23K 50/75* (2016.05); *A23L 31/10* (2016.08); *A23L 33/12* (2016.08); *A23L 33/14* (2016.08)

(58) Field of Classification Search
CPC ........ A23K 10/18; A23K 10/16; A23K 50/30; A23K 50/75; A23L 33/135; A23L 33/12; A23L 33/14; A23L 31/10
USPC .................................................. 435/252.1
See application file for complete search history.

(56) References Cited

U.S. PATENT DOCUMENTS

| 6,217,915 B1 | 4/2001 | Luchansky et al. |
| 6,596,768 B2 | 7/2003 | Block et al. |
| 2006/0094088 A1 | 5/2006 | Picataggio et al. |
| 2011/0020303 A1 | 1/2011 | Kajander et al. |
| 2012/0301932 A1* | 11/2012 | Hong ................. C07K 14/37 435/134 |

FOREIGN PATENT DOCUMENTS

AU  2004203226  *  2/2006

OTHER PUBLICATIONS

Wilson et al., Draft Genome Sequence of Enterobacter cloacae Strain JD6301, Genome Announcements, Mary/Jun. 2013, vol. 2, Iss. 3, pp. 1-2.*
Alvarez et al., Triacylglycerols in prokaryotic microorganisms, Appl Microbiol Biotechnol, vol. 60, (2002), pp. 367-376.*
Wilson, Investigation of the beneficial effect of Enterobacter cloacae strain JD6301 on mice challenged with *Escherichia coli* 0157: H7, A Thesis Submitted to the Faculty of Mississippi State University in Partial Fulfillment of the Requirements for the Degree of Master of Science in Biological Sciences, Dec. 2014.*
Donaldson et al., Characterization of the Novel Enterobacter cloacae Strain JD6301 and a Genetically Modified Variant Capable of Producing Extracellular Lipids, Food & Analytical Bacteriology, vol. 4, Iss. 3, (2014), p. 212-223.*
International Search Report and Written Opinion for corresponding International application No. PCT/US16/28696 dated Jul. 11, 2016 (10 pages).
Holder, Jason W., et al. "Comparative and Functional Genomics of Rhodococcus opacus PD630 for Biofuels Development." PLoS Genetics 7.9 e1002219 (2011): 18 pages.
Meng, Xin, et al. "Biodiesel production from oleaginous microorganisms." Renewable Energy 34.1 (2009): 1-5.
Ranganathan, Srivathsan Vembanur, et al. "An overview of enzymatic production of biodiesel" Bioresource Technology 99.10 (2008): 3975-3981.
Rosen, Evan D., et al. "Adipocytes as regulators of energy balance and glucose homeostasis." Nature 444.7121 (2006): 847-853.
Wynn, James P., et al. "Oils From Microorganisms." Bailey's Industrial Oil and Fat Product, 6th edition, vol. 3.6 Wiley-Interscience (2005): 121-153.

* cited by examiner

*Primary Examiner* — Jennifer M. H. Tichy
(74) *Attorney, Agent, or Firm* — Mendelsohn Dunleavy, P.C.

(57) ABSTRACT

The compositions, method, system, and process of the invention provide increased circulating lipids, including serum triglycerides, in animals by utilizing oleaginous microorganisms as an oral supplement for the animals to increase available energy, enhance probiotics health, and provide enhanced immune system protection against pathogens in the animals.

4 Claims, 22 Drawing Sheets

Study #1: Glucose

- Serum concentrations of glucose did not significantly change in pigs provided JD6301 and JD8715 in comparison to PBS controls

Study #3: Serum TAGs

- Mice provided JD6301 had increased concentrations of circulating serum TAGs on d -1 compared to control animals. After *E. coli* challenge, mice provided JD6301 did not have a significant increase in TAGs while animals in the control group did (p =0.03)

Serum triglycerides- Dosed at 0h, 24h, 48h, and 72h

* For chicks receiving *E. cloacae* JD6301 doses daily for 4 days, serum triglycerides increased on day 5 for chicks that received a 1x10^8 CFU dose in comparison to PBS controls

UTILIZATION OF OLEAGINOUS MICROORGANISMS AS AN ORAL SUPPLEMENT FOR ANIMALS

CROSS-REFERENCE TO RELATED APPLICATION

This application claims priority from U.S. Provisional Patent Application Ser. No. 62/178,871 filed Apr. 21, 2015. The entirety of that provisional application is incorporated herein by reference.

STATEMENT OF GOVERNMENT SUPPORT

This invention was made with government support under 227378 awarded by the National Institute of Food and Agriculture, U. S. Department of Agriculture. The government has certain rights in the invention.

FIELD OF THE INVENTION

The present invention relates to the oral supplementation of dietary feeds and feed supplements for animals. More specifically, the invention provides novel compositions and a method and system for utilizing oleaginous microorganisms as a feed, energy, and/or immune supplement for animals, particularly during times of stress or as an additional energy source, and provides additional probiotics benefits to enhance performance and health of animals.

BACKGROUND OF THE INVENTION

The present invention uses oleaginous microorganisms as an oral supplement composition and enhanced probiotics source for animals. Oleaginous microorganisms including, but not limited to, bacteria, mold, yeast, fungi, and algae, typically produce and accumulate lipids, particularly triacylglycerols (TAGs), and are generally used in the production of many products including biodiesel. Lipids are important sources of energy in animal and human health. Plant and animal fat stores are a common source of lipids for biofuel production and certain prokaryotes have been identified to accumulate lipids as a form of energy storage. Oleaginous microorganisms accumulate more than about 20% of their biomass as lipids and include bacteria, yeast, and fungi, for example. These microorganisms that produce at least 20% or more of their cell weight as lipids are used as the basis for the methodology of the present invention.

The invention is different from any previous or current art in that it is focused on a bacterium to increase the circulating lipids, including triglycerides, in the serum of animals such as swine, poultry, livestock, and/or humans. This supply of microorganisms, when given at the appropriate time(s), can increase available energy and enhance immune protection against pathogens. The probiotics that are currently used have been shown to decrease serum triglyceride concentrations. The present invention is the first novel demonstration of an increase in triglyceride concentrations, which is beneficial to animals, and subsequently animal and livestock producers, as well as to humans. The invention disclosed in U.S. patent application number 2011/0020303 refers to the supplementation of structural lipids (i.e. lysophospholipids), whereas the present invention concentrates on supplementation with storage lipids (i.e. triglycerides). Additionally, that technology concerns the use of probiotics to supply lipids and is different and distinctive from the present invention in that the invention utilizes live microorganisms for delivery of the lipid to the animal.

Current patents relating to the use of lipids supplemented to feed as a means to increase the energy availability to livestock include U.S. Pat. No. 6,217,915, which concerns a feed additive that increases availability of butyric acid and non-digestible oligosaccharides in the gastrointestinal (G.I.) tract. That technology is solely focused upon the addition of butyric acid and oligosaccharides to the feed, whereas the current technology and invention is focused upon the supplementation of live microorganisms to provide lipids to the animal host. Additionally, U.S. Pat. No. 6,596,768 involves unsaturated lipid-enriched feedstocks for ruminants and the use of ionophores for the delivery of the lipids to ruminants. This is entirely different from the present invention in that the delivery of the lipids occurs through providing the live microorganisms to the animals.

SUMMARY OF THE INVENTION

The present invention provides novel compositions, method, system, and process for utilizing oleaginous microorganisms, such as bacteria, mold, yeast, and algae for example, as an oral supplement for animals, including humans, through dietary feeds and feed supplements, as well as through paste, pill, liquid, and/or powder forms, for example. The invention provides benefits of enhanced performance and health, including probiotics benefits, normally and during times of stress, immune system supplement and stimulation, and as an additional energy source for the animal. Providing an animal with oleaginous bacteria, for example, by the compositions and method and system of the invention increases available energy and improves metabolic response to infection or immune challenge.

With the foregoing and other objects, features, and advantages of the present invention that will become apparent hereinafter, the nature of the invention may be more clearly understood by reference to the following detailed description of the preferred embodiments of the invention and to the appended claims.

BRIEF DESCRIPTION OF THE DRAWINGS

These drawings accompany the detailed description of the invention and are intended to illustrate further the invention and its advantages.

DETAILED DESCRIPTION OF THE INVENTION

Figure 1:
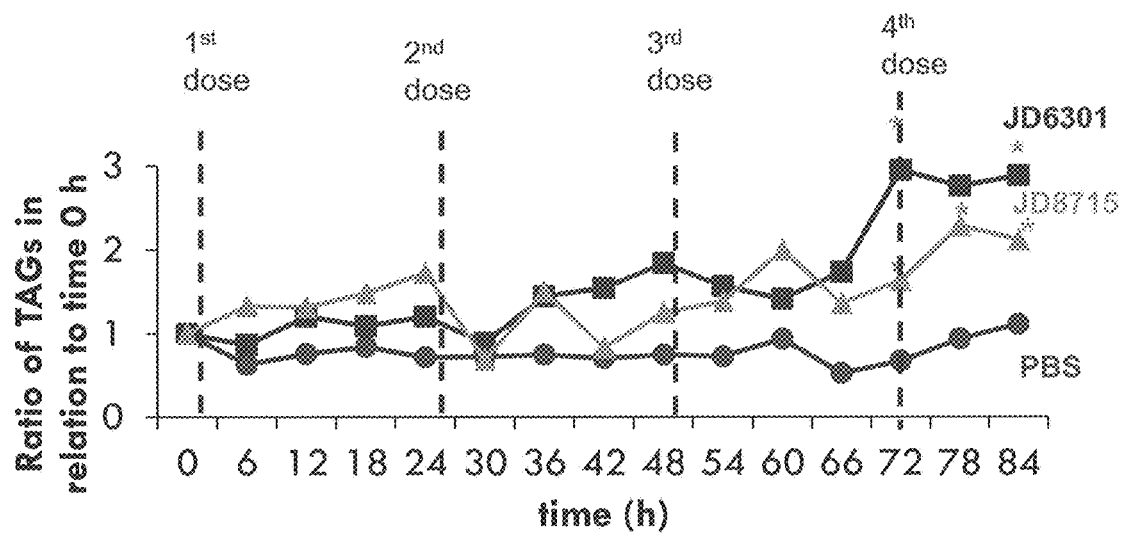
FIG. 1 depicts a graphical illustration of serum triacylglyceride (TAG) concentrations in pigs provided *Enterobacter cloacae* strain JD6301 or JD8715 and those concentrations in the phosphate buffered saline (PBS) control.

The present invention provides a method, system, process, and compositions that utilize oleaginous microorganisms, including those that have the capability to produce extracellular lipids, as an oral supplement composition for animals, including humans, during times of physiological stress or as a supplemental energy source and to enhance probiotics benefits. Moreover, the invention can provide animals with a feed, energy source, and/or immune system supplement. The invention provides a novel methodology to supplement an animal's diet with such microbes, and any enteric oleaginous microbe, to increase the animal's resistance to disease during times when it may be prone to infections. As a supplemental energy source, the addition of these microorganisms can provide a source of energy during periods of nutritional deficits, allow for increased body weight gain and feed efficiency while limiting the intake of the animal, and could allow for a decrease in feed cost, which are typically the largest economic investment within livestock and other animals, aside from the animal itself. Additionally, the invention applies to the utilization of said microorganisms in the application of human health, as the additional source of lipids can potentially benefit humans of nutritional deficient states.

The invention includes utilizing oleaginous bacteria including, but not limited to, species found in the *Enterobacter* genus. The invention discloses that supplementing the diet and/or the water supply, and/or providing an oral dose with either a wild-type or a mutant form of such microbe capable of producing extracellular lipids, or possibly both, can result in an increase in circulating triglycerides (or other usable lipids) and therefore will provide an additional energy source to stressed and sick animals or animals with limited feed intake. This health benefit can provide increased protection against disease at a time when the animal is more prone to sickness, increased efficiency for probiotics, and provides for decreased feed costs.

The present invention is different from any previous or current technologies since the invention concentrates on bacteria to increase the circulating storage lipids, including triglycerides in the serum of the animal. When given at the appropriate time(s), such oral supplement can increase available energy and enhance immune protection against pathogens. The probiotics that are currently used show decreases in serum triglyceride concentrations, while the invention demonstrates an increase in triglyceride concentrations, which could be beneficial to animals.

Supplementing the diet of animals, such as livestock, swine, poultry, and/or humans, with lipids can increase the energy availability, thus providing an additional source of energy during periods of limited feed, illness, and/or stress. The present invention discloses that supplementing the feed, water, and/or orally dosing an animal with oleaginous microorganisms belonging to the *Enterobacter* genus, for example, can increase the amount of energy available to the animal. Oleaginous microbes that can be utilized in the invention are those microorganisms that produce at least 20% of their cell weight as lipids. The invention used a novel strain of *Enterobacter cloacae*, JD6301, isolated by the inventors and capable of producing large quantities of lipids (approximately 50% of cellular body weight), and a genetically-altered strain, JD8715, which was capable of producing extracellular lipids, which in fact showed more extracellular lipids than JD6301. The wild type parent strain JD6301 appeared to be more stable than JD8715, although both strains tested extremely well. These microbes adhered well to animal colon epithelial cells in vitro.

The compositions and methodology of the invention provide for improving the nutritional supplementation and nutritional supplementation profile of, for, or in an animal in need. The invention provides for forming at least one oral supplement composition that comprises at least one delivery media combined with one or more oleaginous microorganism and for administering the composition, actively, passively, or both, to the animal in need in an effective amount, such that the amount improves or enhances the nutritional supplementation, and specifically the nutritional supplementation profile, of or in the animal. The delivery media can be an orally ingestible solid, liquid, or a combination thereof.

Further, the oral supplement composition of the invention comprises at least about 20 percent of its cellular weight as lipid.

The invention is suitable to providing supplementation to animals in need of nutritional supplementation, typically but not limited to an animal such as swine (pig), bovine (cow), poultry, and/or a human, both directly and indirectly through consumption of such animals. The invention uses at least one oleaginous microbe or microorganism, such as bacteria, mold, yeast, fungi, algae, or a combination, with the delivery media for the oral supplement. The bacteria itself can be enteric, specifically the enteric bacteria *Enterobacter cloacae* strain JD630I (ATCC® accession no. PTA-127111), *Enterobacter cloacae* strain JD8715 (ATCC® accession no. PTA-127112), both strains having been deposited on Sep. 9, 2021 with the ATCC® Patent Depository, 10801 University Boulevard, Manassas, Va. 20110, USA, or a particular combination of the two strains. The supplement is or can be dry, liquid, and/or water-based and is administered via consumption by the animal. The studies that resulted in the present invention utilized administration to animals either once daily, continuously, or through a continuous supply in the feed or the water. For example, test dosages were $1\times10^9$ CFU/mice and $1\times10^9$ CFU/kg, for pigs. In the studies, oleaginous microorganism supplements with enteric bacteria strains JD6301 and JD8715 were added to a medicated water supply (pigs) and in water bottles (mice). In application, the oral supplement compositions and methods of the invention can be provided and utilized via feed (mixed in) or via medicated water supplies, for example. The oral supplement composition of the invention can be utilized as a nutritional supplement, an immune system supplement, and an energy source or supplement, for example, and can be provided to animals, including humans, through dietary feeds and feed supplements, as well as through other methods including, but not limited to, paste, pill, liquid, and powder forms, for example.

The invention provides a cultured isolate of a strain of the oleaginous enteric bacterium *Enterobacter cloacae* wild type parent strain JD6301 that produces a large amount of extracellular lipids, specifically in an amount of at least 50% of its cellular body weight, and that provides an animal with an oral-based supplement composition, nutritional supplement, energy supplement, or immune system supplement, or a combination thereof, and wherein the isolate is the genetically-altered oleaginous enteric bacterium *Enterobacter cloacae* strain JD8715. Further, the present invention provides an oral supplement composition that comprises at least one dosage of the cultured isolate of the oleaginous enteric bacterium *Enterobacter cloacae* wild type parent strain JD6301, the oleaginous enteric bacterium *Enterobacter cloacae* strain JD8715, or a combination thereof, used with at least one delivery media. The composition is effective for providing an animal with an oral-based feed, nutritional, energy, or immune system supplement, or a combination of these supplements, for example. Moreover, the dosage of the strain provided is adequate to effectively improve the health, energy, and/or immune system response of the animal. The delivery media can be an orally ingestible solid, liquid, or combination thereof.

Figure 2:
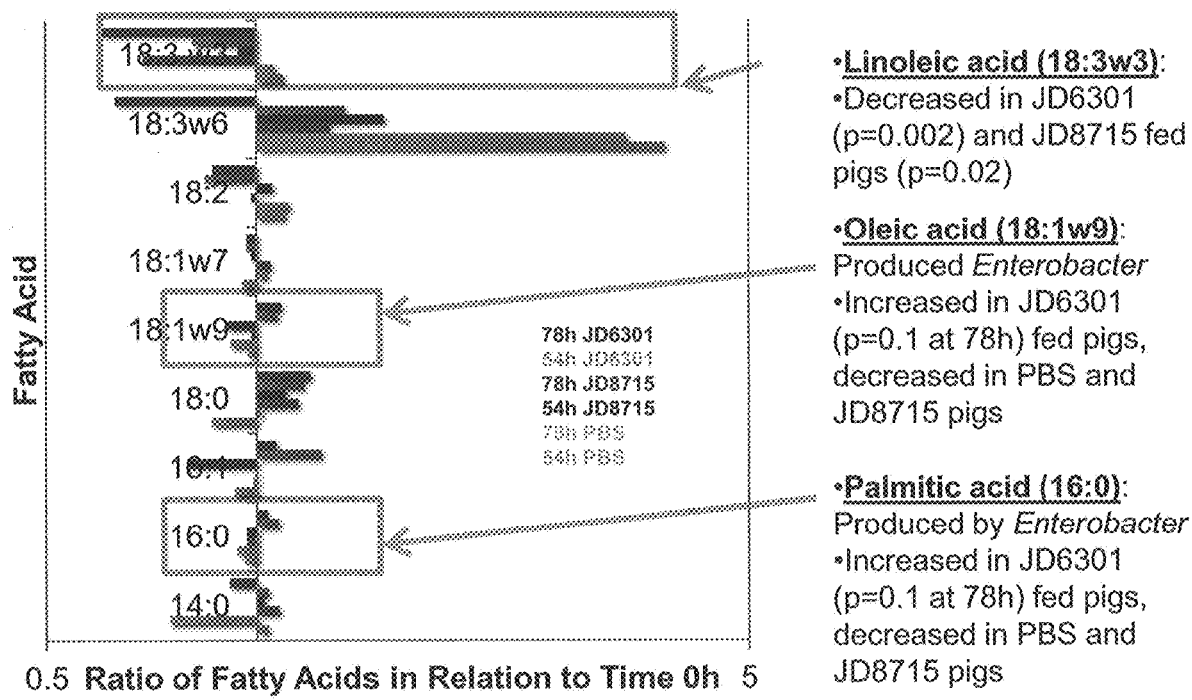
FIG. 2 depicts a graphical illustration of serum lipid profiles showing the ratios of linoleic, oleic, and palmitic fatty acids relative to time.
Figure 3:
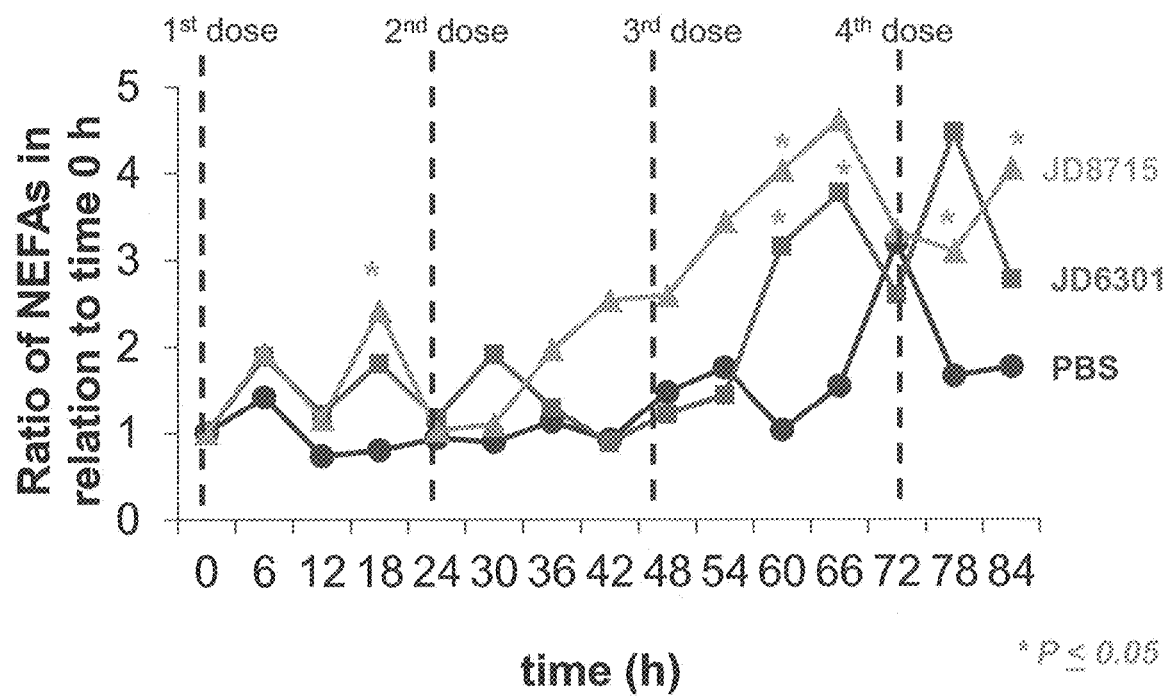
FIG. 3 depicts a graphical illustration of serum non-esterified fatty acid (NEFA) concentration in pigs provided either *Enterobacter cloacae* strain JD6301 or JD8715.
Figure 4:
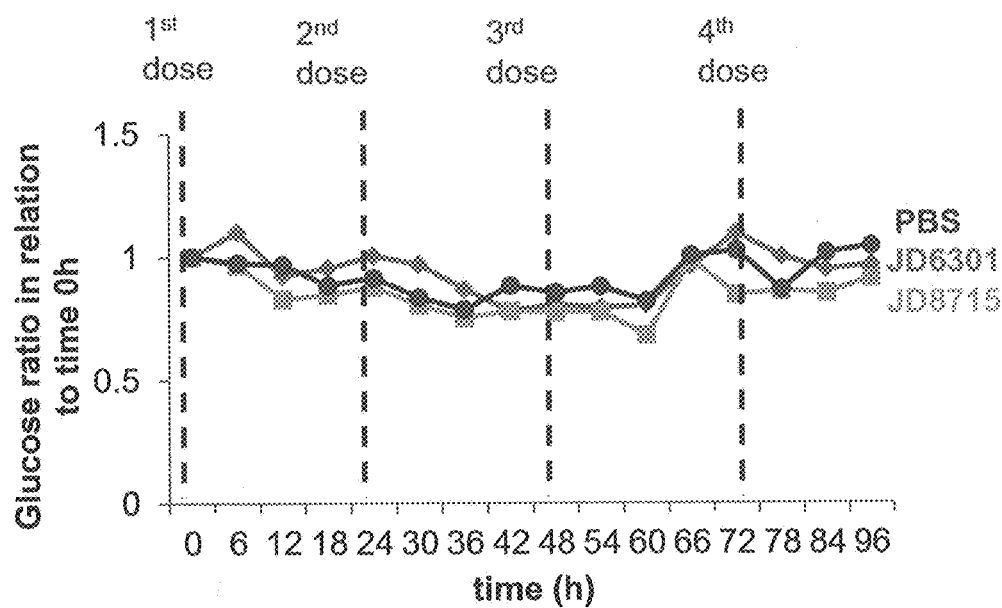
FIG. 4 depicts a graphical illustration of serum glucose concentrations in pigs provided JD6301 and JD8715 compared to PBS controls.
Figure 5:
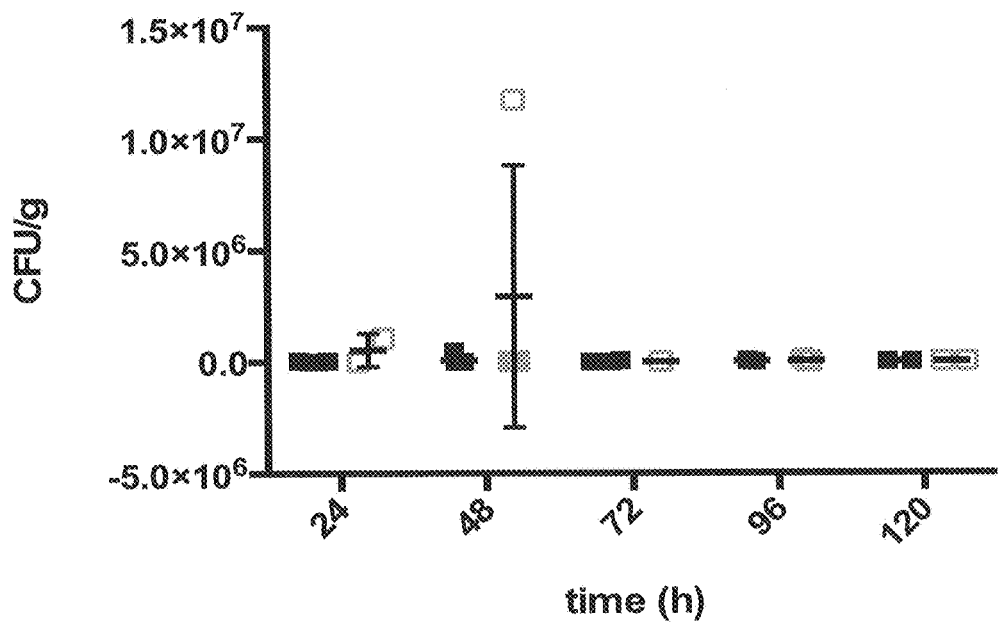
FIG. 5 depicts a graphical illustration of fecal presence in animals provided *Enterobacter cloacae* strain JD6301 and JD8715.
Figure 6:
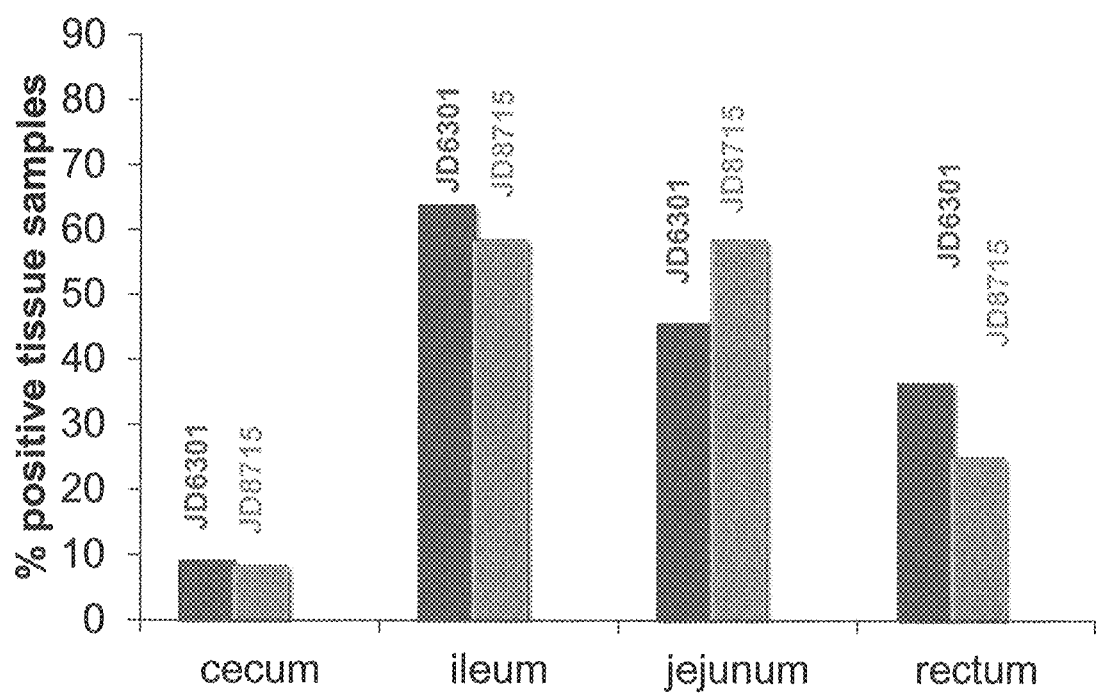
FIG. 6 depicts a graphical illustration of the presence of *Enterobacter cloacae* strain JD6301 or JD8715 in the gastrointestinal (GI) tract of the animals, specifically in the cecum, ileum, jejunum, and rectum.

Novel Use of Lipid-Producing Bacteria to Increase Circulating Triglycerides in Swine Weanling pigs are at a high risk of succumbing to illness primarily due to a weakened immune system due to such things as stress from weaning, translation, and an insufficient supply of available energy. Solutions have been investigated to supplement feed with alternate energy sources, yet limitations still arise with the utilization of these sources by pigs due to their relatively immature gastrointestinal (GI) systems. Therefore, the inventors of the present invention evaluated whether supplementation to swine of bacteria that produce triacylglycerides (TAGs) could increase the concentrations of circulating TAGs and thus available energy. The organism that was tested was the oleaginous bacteria *Enterobacter cloacae* JD6301, which is a novel isolate strain of *Enterobacter* that was found to produce nearly 50% of its body weight in lipids in the laboratory. Thirty-six (36) weaned pigs (30 days of age) were housed in individual pens equipped with feeders and nipple waterers. Pigs were allowed 2-weeks for acclimation, stratified by body weight and randomly assigned to 1 of 3 treatment groups (n=12/group). Treatments consisted of daily oral supplementation for 5 days with: 1) *E. cloacae* (JD6301; $1\times10$ CFU); 2) an alternate form (genetically-altered strain) of *E. cloacae* (JD8715; $1\times10^{10}$ CFU) that secretes TAGs into the surrounding environment; or 3) an equivalent volume of phosphate-buffered saline (PBS) as a control. Serum samples were collected every 6 hours and analyzed for non-esterified fatty acids (NEFAs), triacylglycerides (TAGs), free glycerol, and glucose concentrations. At the conclusion of the trial, GI contents were collected and analyzed for colonization patterns of JD6301 or JD8715. Circulating TAGs increased by 72 hours in comparison to PBS controls for pigs supplemented with either JD6301 (P=0.04) or JD8715 (P=0.01). Analysis of the fatty acid profile of serum revealed that pigs provided JD6301 had an increase in oleic acid and palmitic acid. NEFAs also increased in pigs provided either JD6301 or JD8715 60-hours post-supplementation (P<0.05). Glucose concentrations did not change between control pigs and those provided either JD6301 or JD8715. Both JD6301 and JD8715 were present in the GI tract, suggesting that both forms of *Enterobacter* are capable of surviving within the GI tract. Both strains had greatest presence of *Enterobacter* in the jejunum, which is the ideal location for absorption of triglycerides by the animal. FIG. 1 shows that the serum triglyceride concentrations increased in pigs provided *Enterobacter* sp. JD6301 or JD8715 within 72 h of initial dose in relation to the baseline concentrations of the individual pigs. FIG. 2 shows serum lipid profiles—linoleic acid (18:3w3) decreased in JD6301 (P=0.002) and JD8715 fed pigs (P=0.02); oleic acid (18:1 w9) produced by *Enterobacter*-increased in JD6301 (P=0.1 at 78 h) fed pigs and decreased in phosphate-buffered saline (PBS) and JD8715 fed pigs; and palmitic acid (16:0) produced by *Enterobacter*-increased in JD6301 (P=0.1 at 78 h) fed pigs and decreased in PBS and JD8715 fed pigs in relation to the baseline concentrations of the individual pigs. FIG. 3 shows that the concentration of serum NEFAs (non-esterified fatty acids) increased in pigs provided either JD6301 or JD8715 in relation to the baseline concentrations of the individual pigs. FIG. 4 indicates that serum concentrations of glucose did not significantly change in pigs provided JD6301 and JD8715 in comparison to PBS controls. FIG. 5 shows results of fecal presence (Individual values are plotted, with means represented. Error bars indicate standard error. WT JD6301 (□) and JD8715 (■). Minimal clearance was observed after 48 h). FIG. 6 shows the results of the GI presence of each strain of *Enterobacter cloacae* in the cecum, ileum, jejunum, and rectum of the test animals. The increase in serum TAGs, NEFAs, and changes in the fatty acid profiles indicate that the pigs provided *Enterobacter cloacae* were utilizing the lipids provided by these bacteria. The presence of the *E. cloacae* in the GI tract indicates that the bacteria are able to survive initial passage into the lower parts of the GI tract, which is important for dissemination of lipids to the host.

Figure 7:
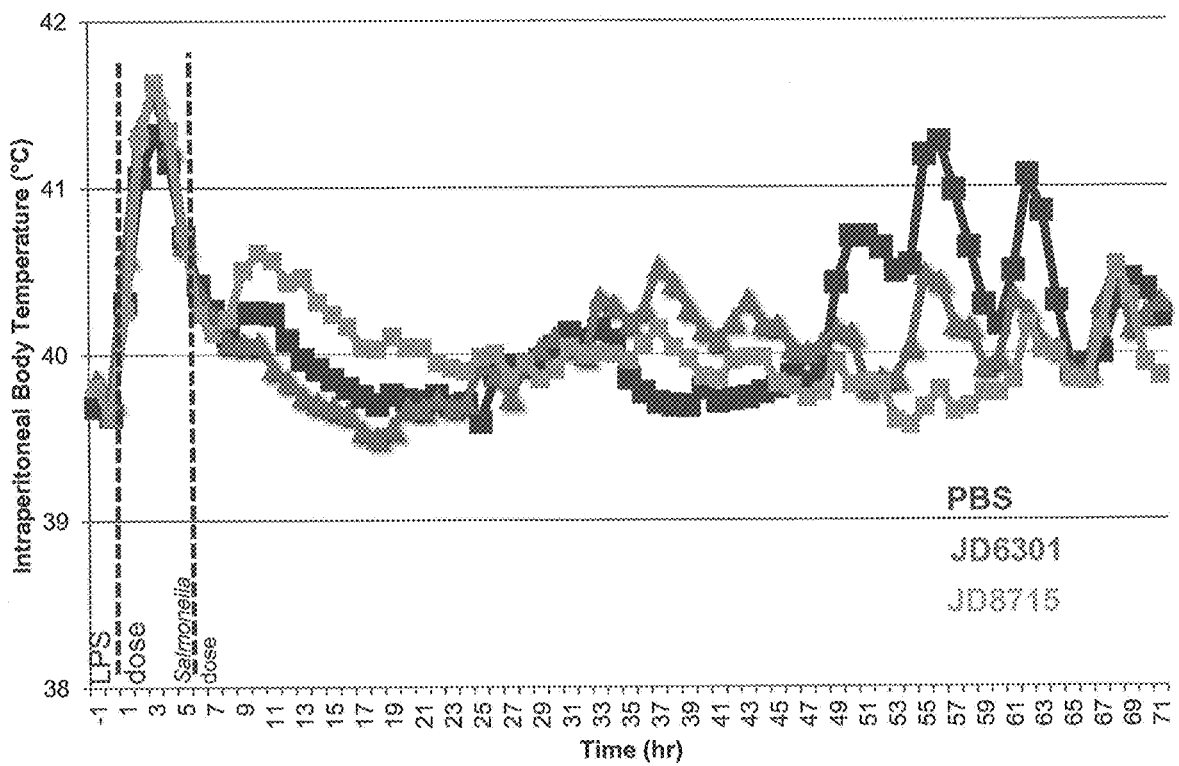
FIG. 7 depicts a graphical illustration of the body temperatures of the animals in the treatment groups after the LPS challenge (study 2).
Figure 8:
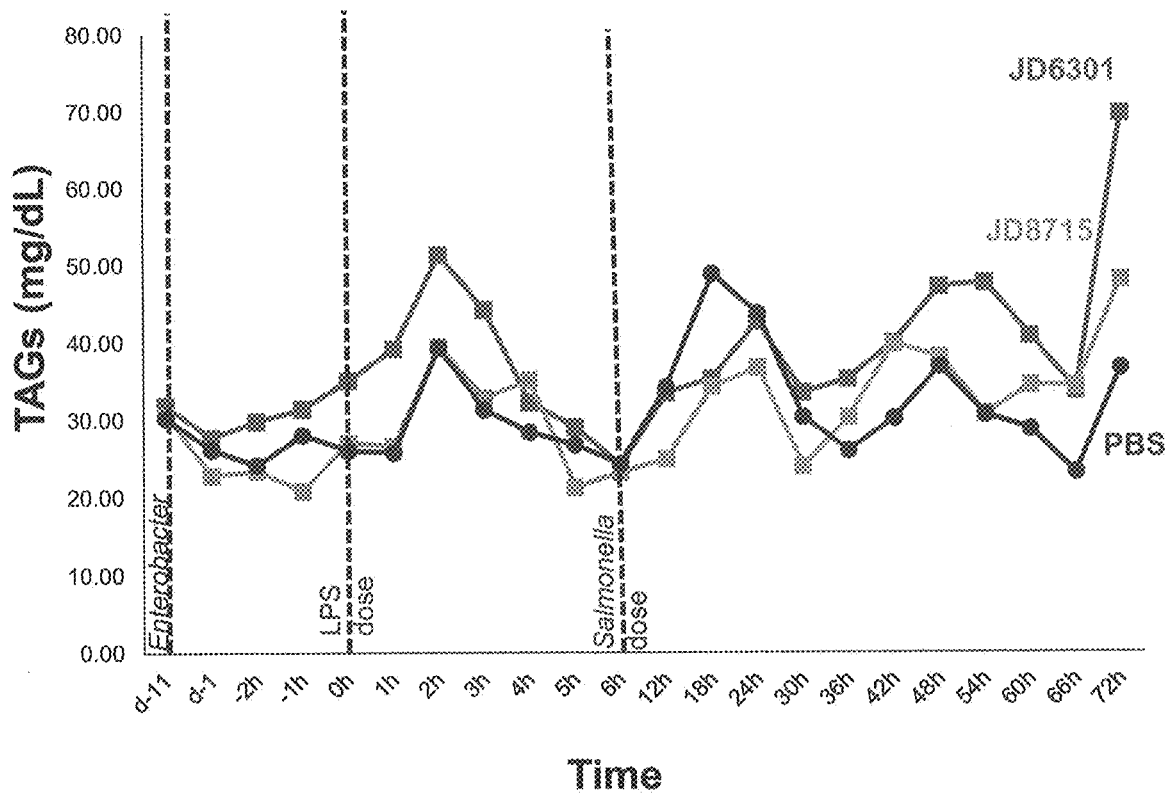
FIG. 8 depicts a graphical illustration of serum TAG concentrations in pigs provided *Enterobacter cloacae* strain JD6301 or JD8715 in comparison to PBS controls after 5 days of supplementation (study 2).
Figure 9:
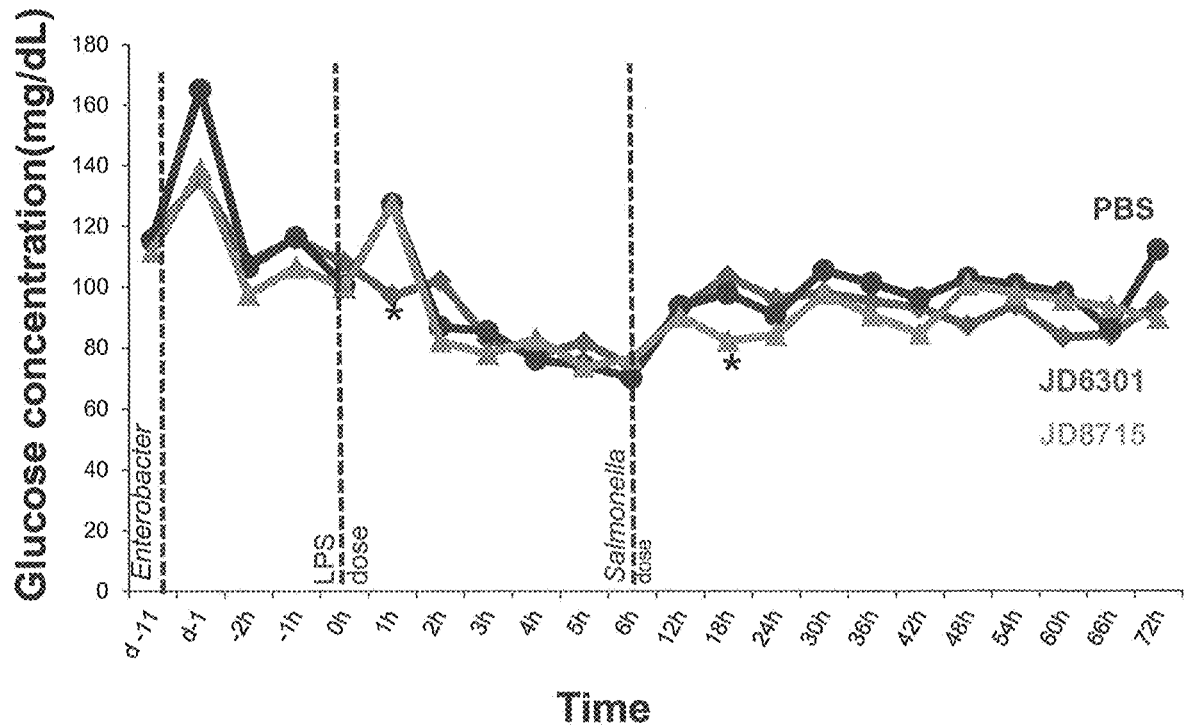
FIG. 9 depicts a graphical illustration of serum glucose concentrations in pigs provided *Enterobacter cloacae* strain JD6301 and JD8715 compared to PBS controls (study 2).
Figure 10:
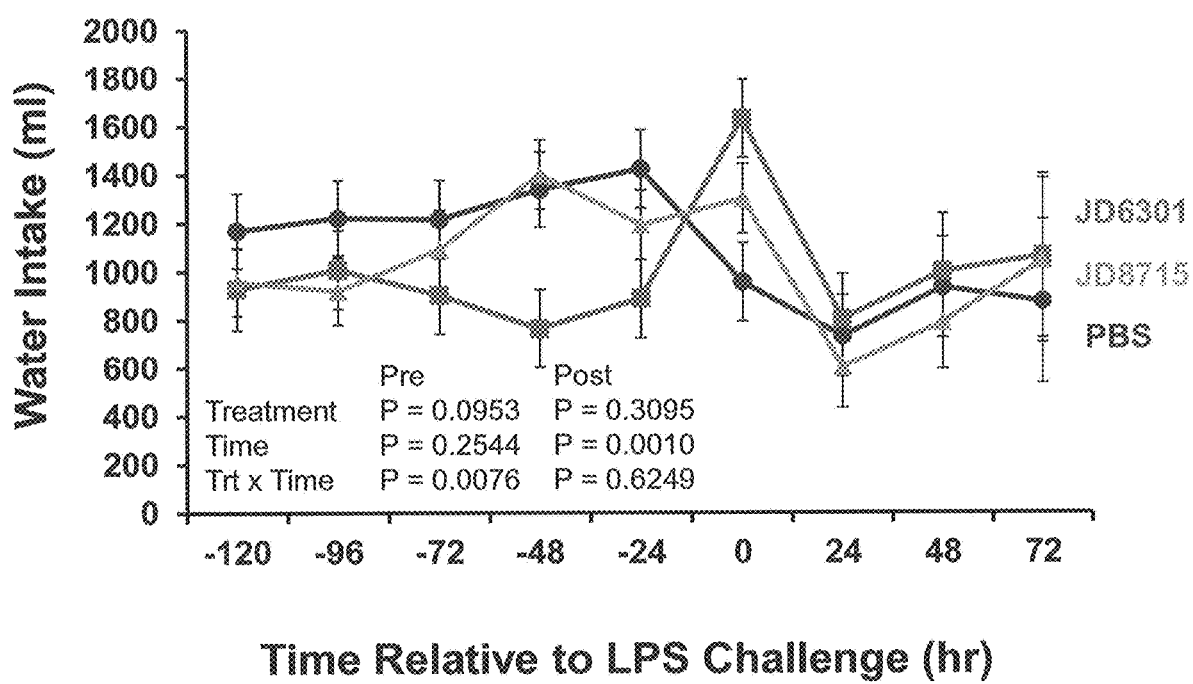
FIG. 10 depicts a graphical illustration of water intake of animals provided *Enterobacter cloacae* strain JD6301 or JD8715 in comparison to PBS controls (study 2).
Figure 11:
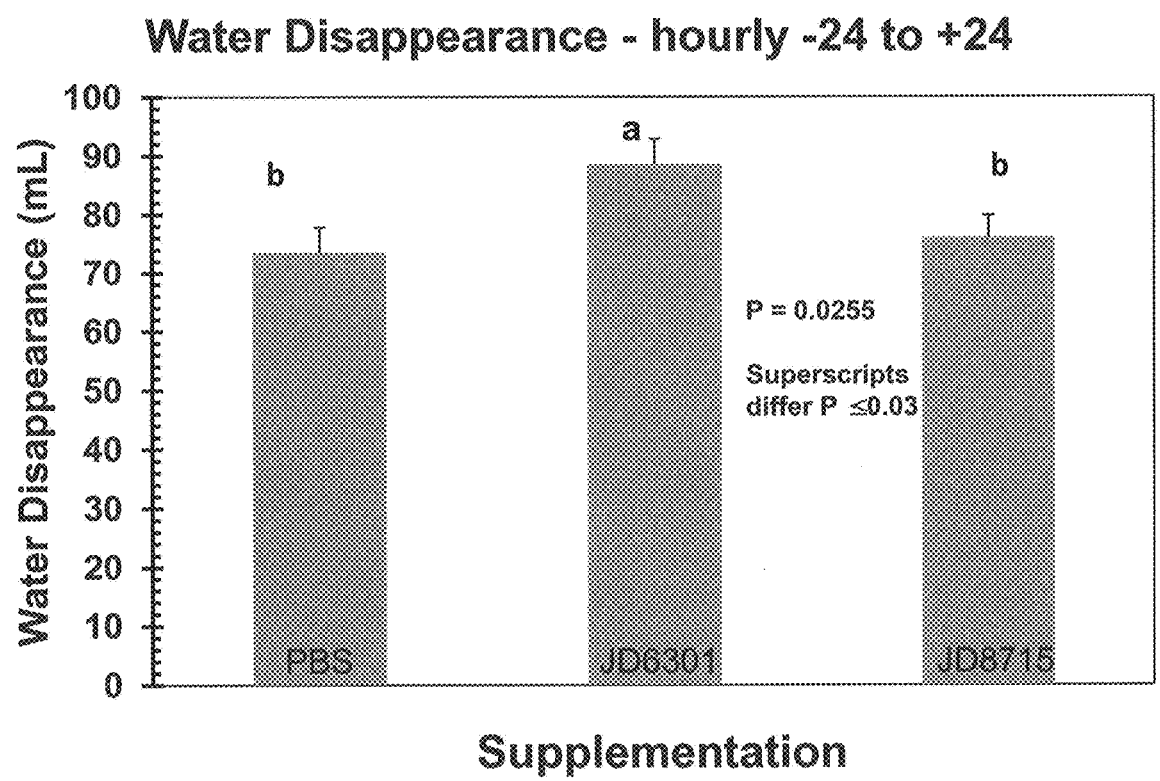
FIG. 11 depicts a graphical illustration of water disappearance in animals provided JD6301 and JD8715 in comparison to PBS controls (study 2).
Figure 12:
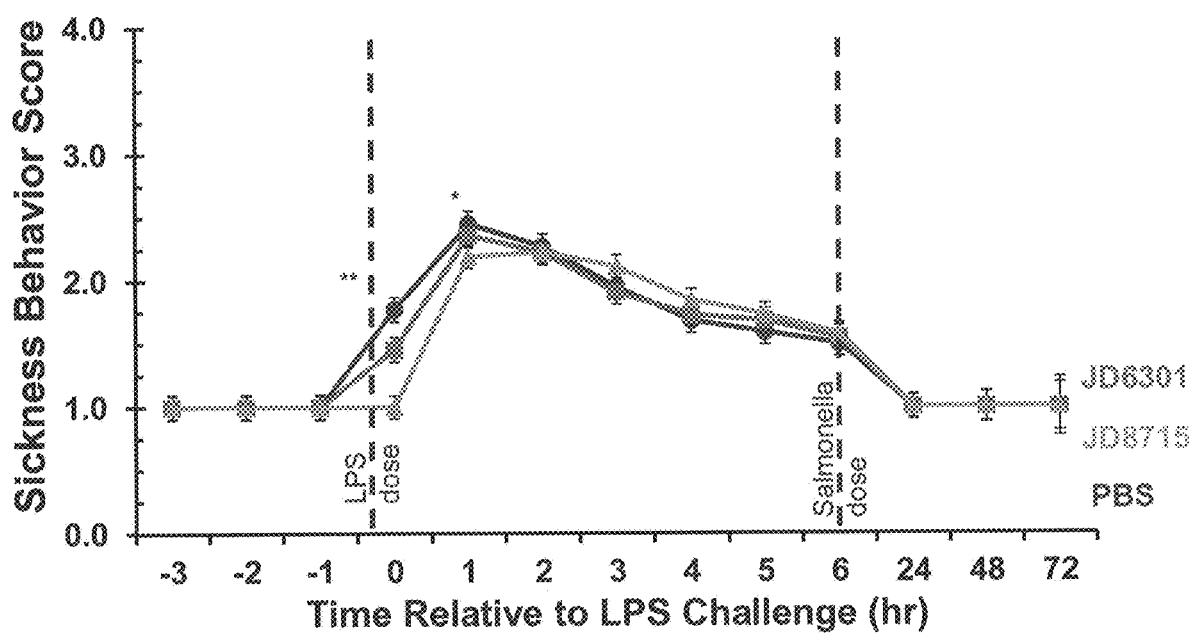
FIG. 12 depicts a graphical illustration of the sickness behavior score of animals provided JD6301 and JD8715 in comparison to PBS controls (study 2).
Figure 13:
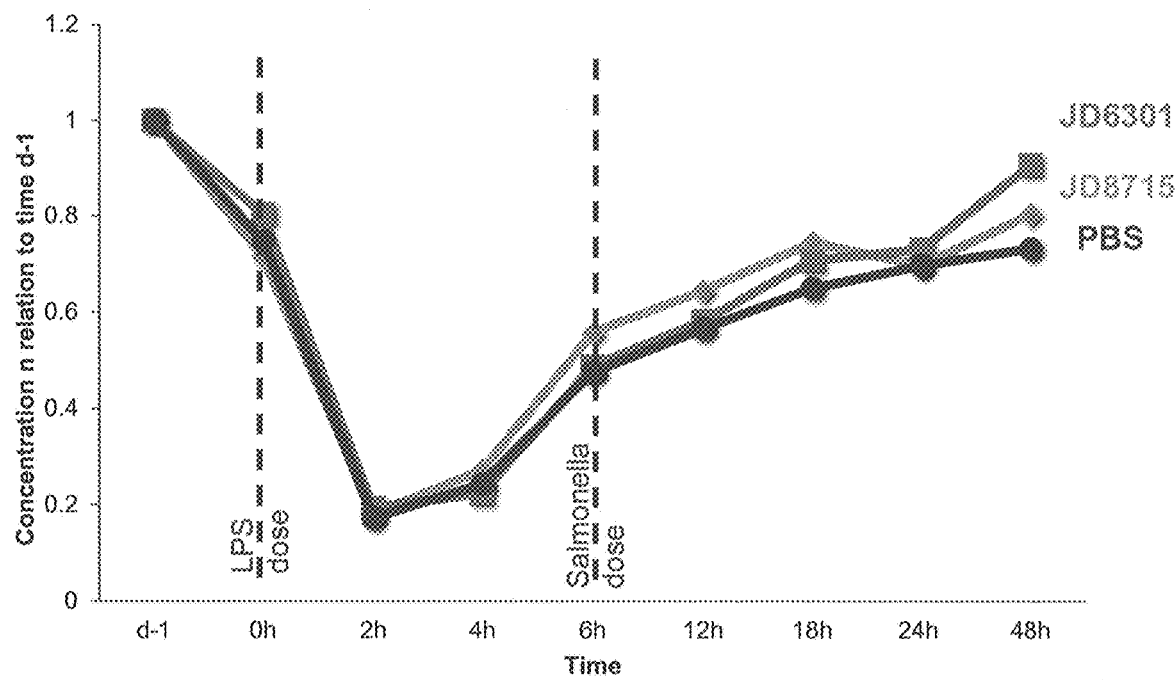
FIG. 13 depicts a graphical illustration of the white blood cell count of animals provided JD6301 and JD8715 in comparison to PBS controls (study 2).

In an additional study, weanling pigs were provided 1×10⁹ CFU/day via medicated water suppliers for 5 days prior to a challenge with LPS and *Salmonella typhimurium* and for 3 days after challenge. Serum and bacterial presence in the gastrointestinal tract were monitored for 3 days post-challenge. Body temperatures increased identically in animals provided either form of *E. cloacae* in comparison to PBS controls immediately following exposure to LPS. However, following exposure to *Salmonella typhimurium*, the body temperature increase in control pigs was higher than in pigs provided JD6301 or JD8715. This correlated with an increase in neutrophils present in pigs provided JD6301. The presence of *Salmonella* decreased in the colon in pigs provided JD6301, suggesting that this strain may promote clearance of this pathogen from the GI tract of pigs. FIG. 7 shows that body temperatures spiked in all three treatment groups after the LPS challenge, but pigs provided PBS had a temperature increase again at d2. FIG. 8 indicates that serum triglycerides increased in pigs provided JD6301 in comparison to PBS ($P=0.05$) after 5 d of supplementation in relation to the baseline concentrations of the animals. Additionally, TAGs increased in PBS at 18 h post challenge ($P<0.04$) in comparison to either JD6301 or JD8715. FIG. 9 shows that in pigs provided JD6301, serum glucose at 1 h post LPS was significantly reduced in comparison to pigs provided JD8715 or PBS pigs. FIG. 10 shows water intake test data and FIG. 11 shows the significant difference observed in water disappearance (hourly −24 to +24), where $P=0.0255$ and superscripts differ $P \le 0.03$. FIG. 12 shows the test sickness behavior score, where all treatments differ by $P \le 0.02$ and the control differs from JD8715 where $P=0.05$. For animals not exhibiting any signs of illness, a score of 1 was assigned. Increasing severity of illness was ranked 2-5 by a skilled technician for individual pigs. At the point of providing the LPS challenge, pigs from all groups exhibited signs of illness. However, the severity as a group was more significant for the animals in the PBS group than for pigs provided *E. cloacae*. FIG. 13 shows the concentration of white blood cells count in comparison to the baseline measurements for the animals, where

|  | Pre | Post |
| --- | --- | --- |
| Treatment | P = 0.4199 | P = 0.0450 |
| Time | P = 0.0002 | P < 0.0001 |
| TRT × Time | P = 0.9053 | P = 0.1985 |

Figure 14:
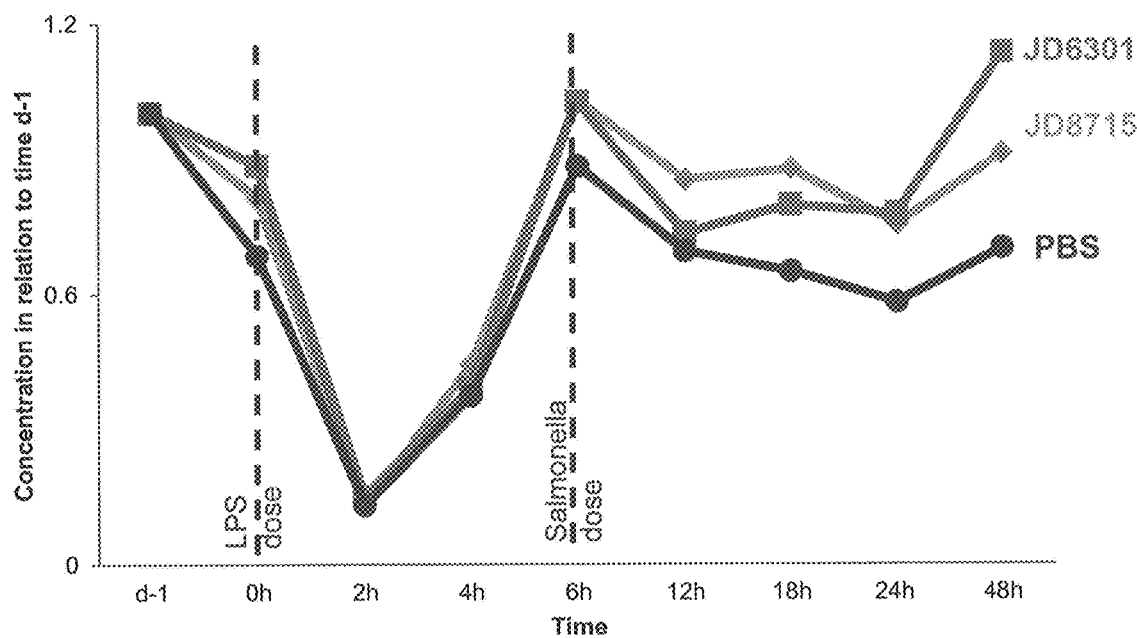
FIG. 14 depicts a graphical illustration of neutrophils concentrations in animals provided JD6301 and JD8715 in comparison to PBS controls (study 2).

FIG. 14 shows the concentration of neutrophils in comparison to the baseline measurements for the animals, where

|  | Pre | Post |
| --- | --- | --- |
| Treatment | P = 0.1630 | P = 0.1.889 |
| Time | P = 0.0071 | P < 0.0001 |
| TRT × Time | P = 0.1969 | P = 0.0311 |

Figure 15:
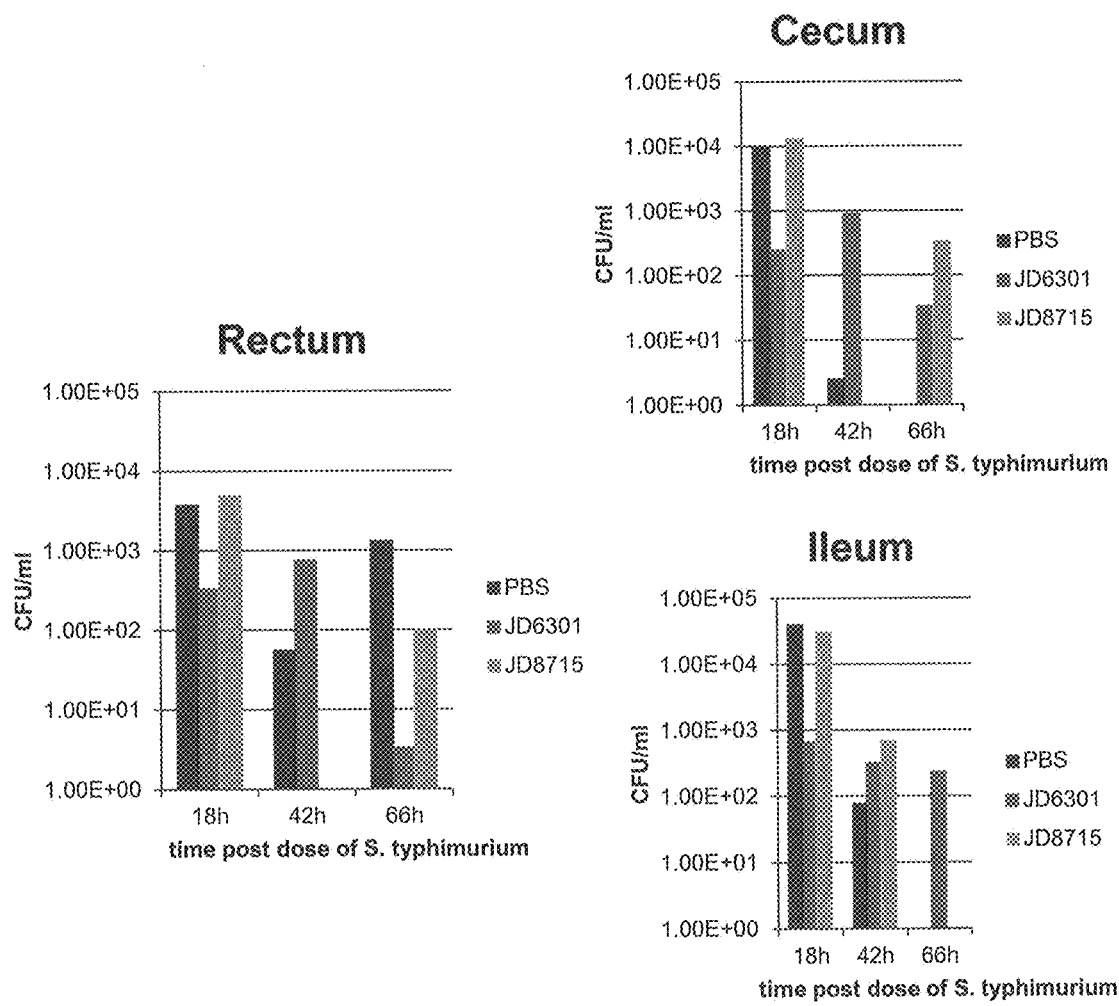
FIG. 15 depicts a graphical illustration of *Salmonella* presence in the GI tract, specifically the rectum, cecum, and ileum, of animals provided JD6301 and JD8715 or PBS controls prior to being challenged with *Salmonella typhimurium* (study 2).
Figure 16:
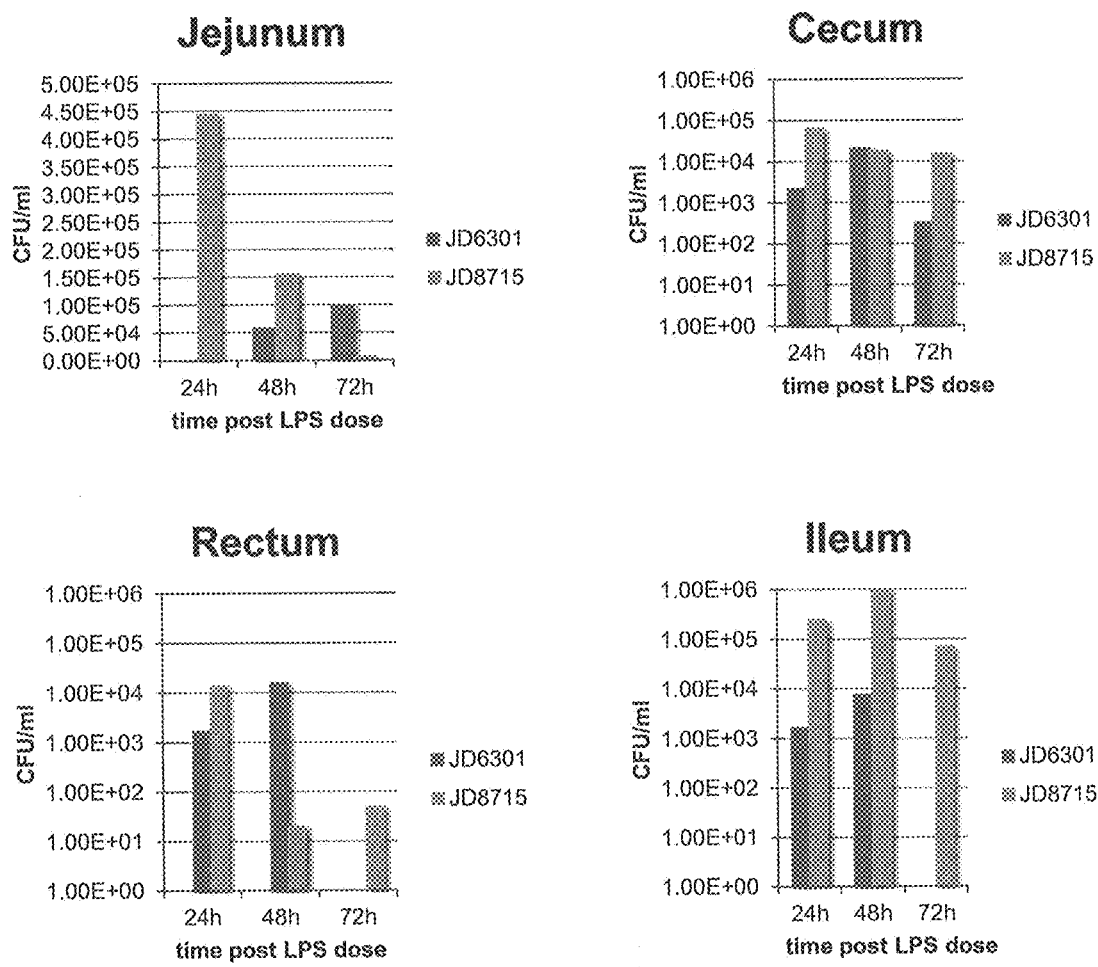
FIG. 16 depicts a graphical illustration of *Enterobacter cloacae* JD6301 or JD8715 presence in the GI tract, specifically the jejunum, rectum, cecum, and ileum following challenge with *Salmonella typhimurium* (study 2).

FIG. 15 shows the *Salmonella* presence in the GI tract (specifically the rectum, cecum, and ileum), where *Salmonella* was cleared earlier in pigs provided JD6301. FIG. 16 provides data concerning the *Enterobacter* presence in the GI tract (specifically the jejunum, rectum, cecum, and ileum), where JD6301 was cleared from the rectum by 72 h, which may correlate with the clearance of *Salmonella* by that time. Table 1 shows the alterations in the expression of genes related to triglyceride production or utilization. Adipose tissue was collected on d1, d2, and d3 from pigs. The expression of genes related to triglyceride production/utilization was analyzed by qPCR. Table 2 shows the expression of lipid production genes in pigs provided JD6301. Increased expression was observed in Apolipoprotein A1 and Insig1 in comparison to the controls. Additionally, a significant decrease was observed in lipase expression. Table 3 shows the expression of lipid production genes in pigs provided JD8715. Increased expression was observed of ApolipoproteinA1, Insig1, and Lipase on d1. Significant decreases were observed in all genes tested by d3 in comparison to control pigs. This suggests that pigs provided JD8715 had more triglycerides available on d1. Together, these data indicate that the pigs provided JD6301 had an increase in neutrophil recruitment, and the increase in serum triglycerides was due to utilization of the bacteria and not through production by the animal in response to the infection.

Figure 17:
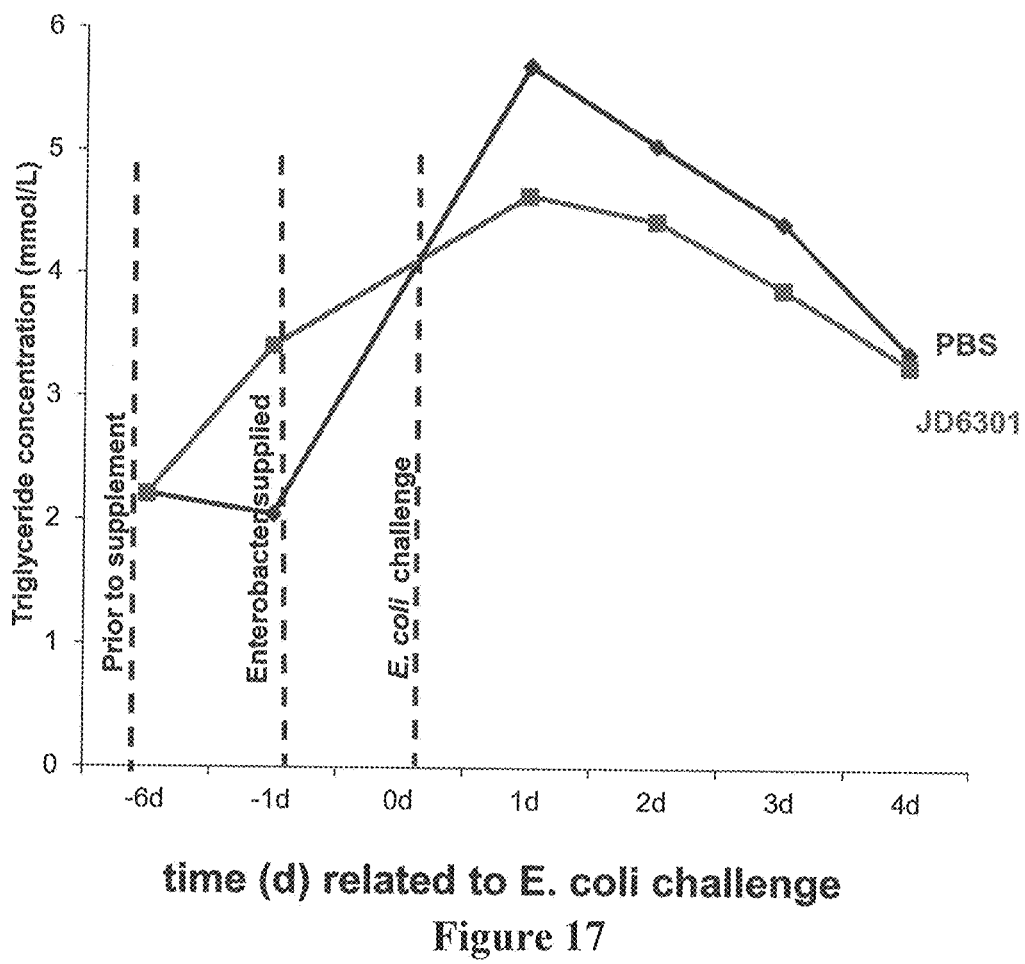
FIG. 17 depicts a graphical illustration of serum TAG concentrations in mice provided JD6301 in comparison to PBS controls (study 3).
Figure 18:
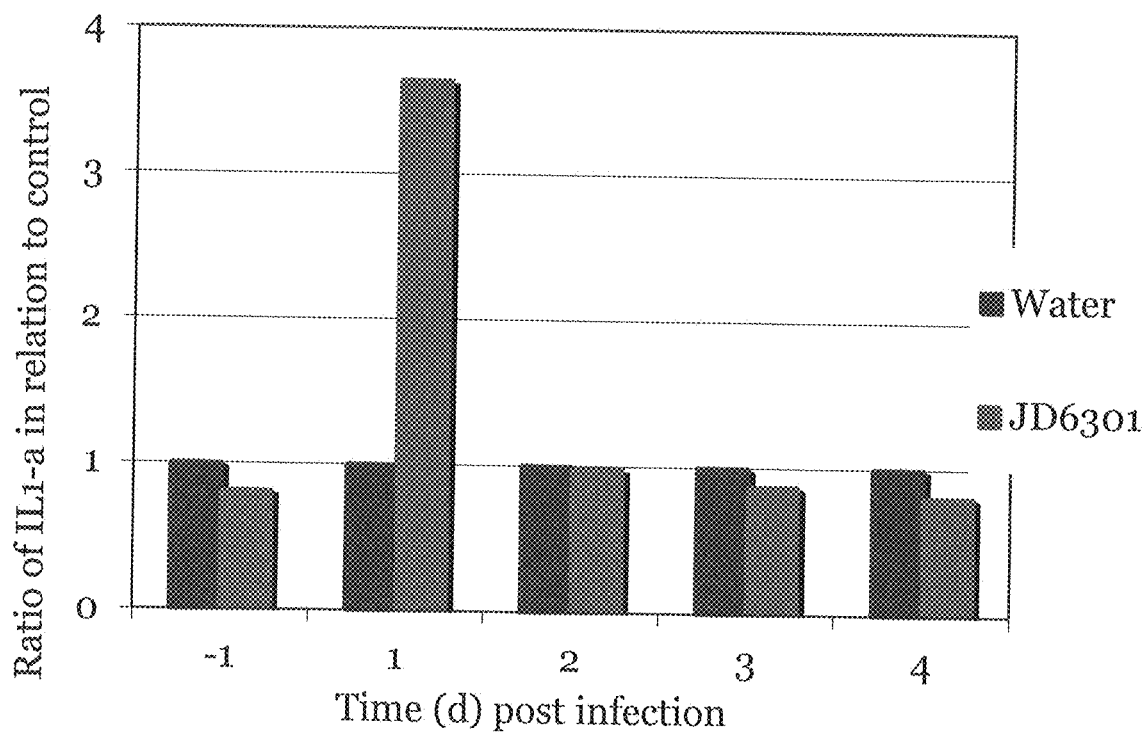
FIG. 18 depicts a graphical illustration of cytokine analysis for mice provided JD6301 in comparison to controls (study 3).
Figure 19:
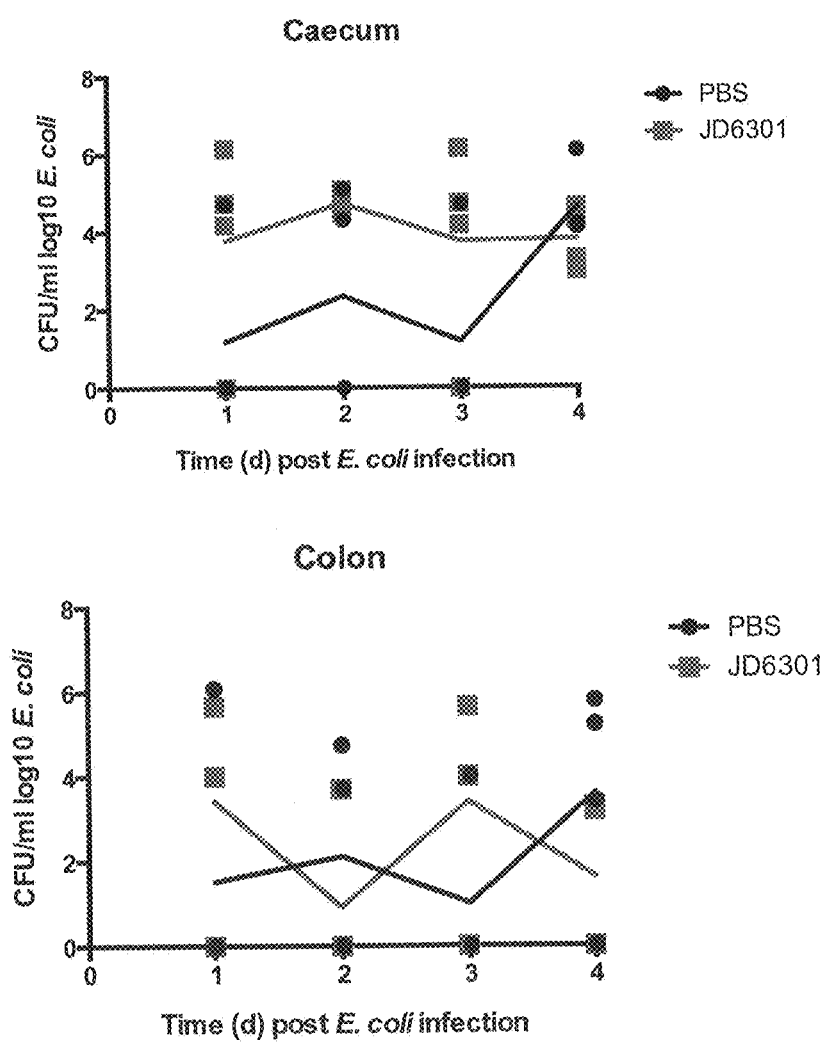
FIG. 19 depicts a graphical illustration of *E. coli* presence in mice (GI tracts (caecum and colon) for mice provided JD6301 in comparison to PBS controls (study 3).
Figure 20:
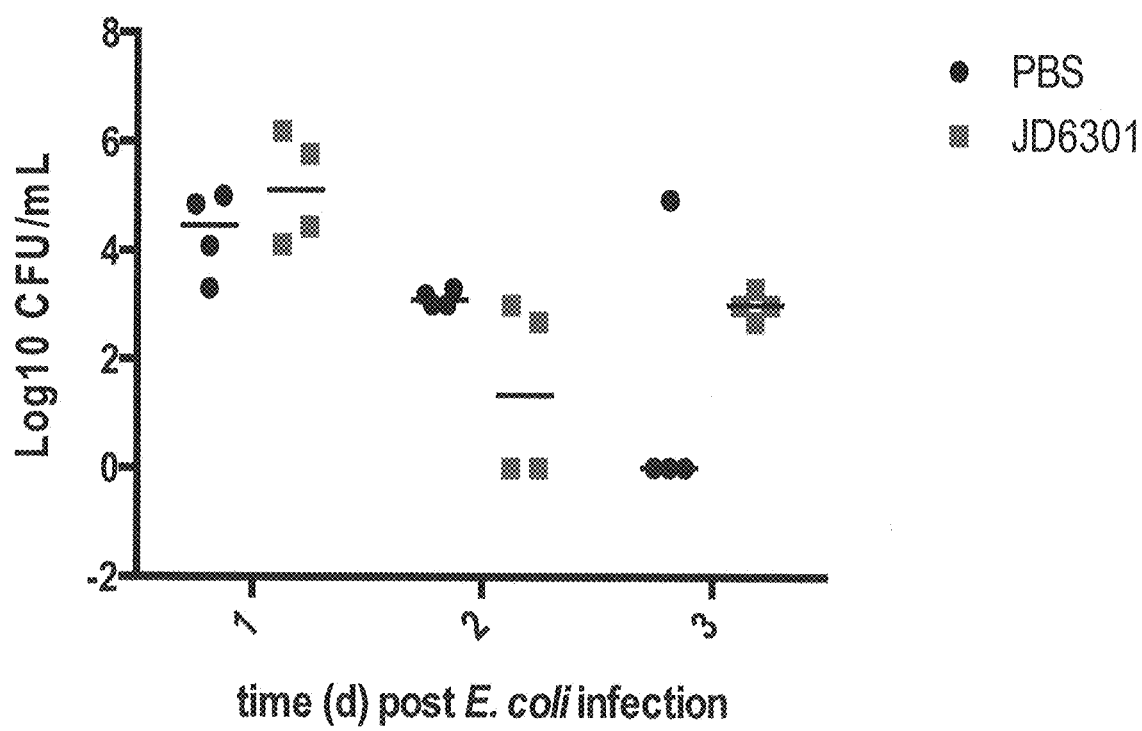
FIG. 20 depicts a graphical illustration of fecal presence of *E. coli* in mice GI tracts for mice provided JD6301 in comparison to PBS controls (study 3).
Figure 21:
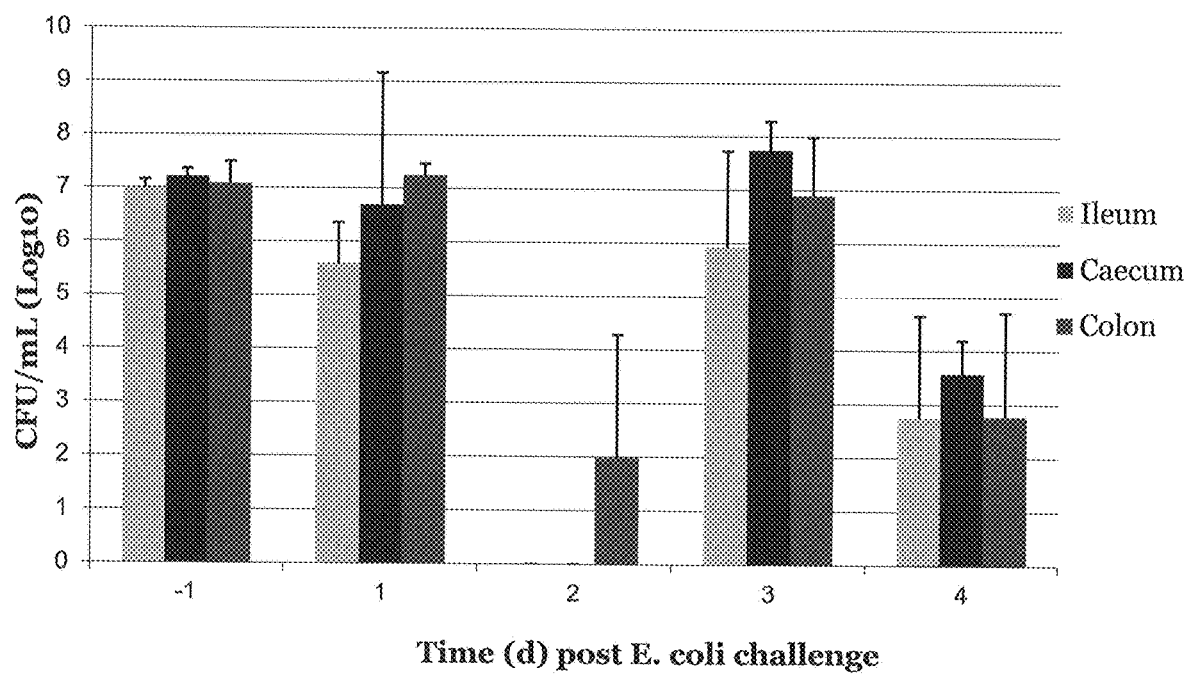
FIG. 21 depicts a graphical illustration of the GI presence of JD6301, specifically in the ileum, caecum, and colon, in animals following challenge with *E. coli* (study 3).
Figure 22:
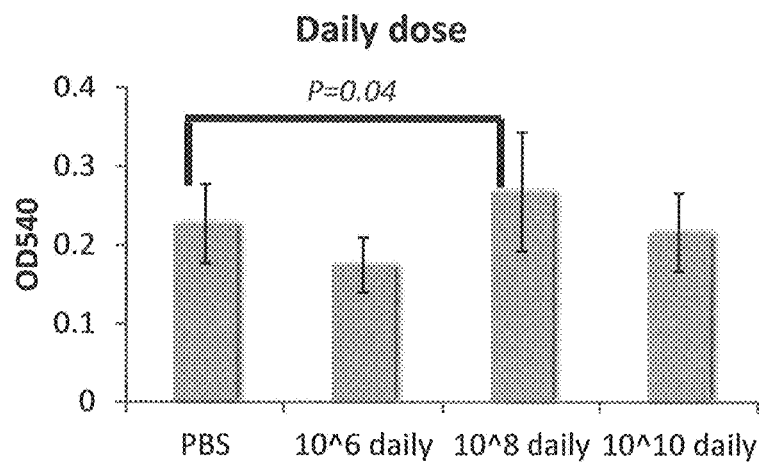
FIG. 22 depicts a graphical illustration of serum triglyceride level increases compared to PBS controls for poultry provided *E. cloacae* JD6301.

This technology has also been tested in mice. In this study, 60 Balb/c mice were separated into 2 groups: group 1 received PBS and group 2 received 1×10⁸ JD6301 through water bottles. Mice were provided the *Enterobacter cloacae* strain JD6301 for 6 days prior to challenge with *E. coli* O157:H7 and 4 days post-challenge. Serum triglycerides and cytokines were analyzed daily, as well as GI contents for the presence of *Enterobacter cloacae* JD6301 and *E. coli* O157:H7. The serum triglycerides increased in mice provided JD6301. Following challenge with *E. coli*, the populations of *E. coli* were reduced in the colon of the mice provided JD6301. Additionally, mice provided JD6301 had an increase in IL-1α and an increase in neutrophils within 24 hours post-exposure to *E. coli*. FIG. 17 shows that mice provided JD6301 had increased concentrations of circulating serum TAGs on d1 compared to control animals. After *E. coli* challenge, mice provided JD6301 did not have a significant increase in TAGs while animals in the control group did ($P=0.03$). FIG. 18 shows cytokine analysis and Luminex multiplex for detection of cytokines and chemokines in mice. This figure shows that IL-la increased in mice provided JD6301 on d1, which correlated to an increase in neutrophils observed on d1. FIG. 19 shows the GI presence of *E. coli* where, by d4, mice provided JD6301 had less *E. coli* present in the colon. FIG. 20 shows the fecal presence of *E. coli* and that an increased clearance of *E. coli* at d2 corresponded with a decrease in GI presence in mice provided JD6301. FIG. 21 shows the GI presence of JD6301 and that the presence of JD6301 fluctuated following challenge with *E. coli*. Tests showed physiological differences such that liver abnormalities were observed on a macroscopic level in mice provided PBS and *E. coli*. Additionally, histology indicated minor liver necrosis was observed in the control cells, but not in mice provided JD6301. Test findings demonstrated that oleaginous microorganisms, including bacteria and specifically JD6301, can be administered to animals via feed and via water supplies. Ingestion of the bacteria leads to presence in the GI tract of the animal, predominately in the jejunum, which may allow for absorption of the lipids by the enterocytes. An additional result is an increase in serum triacylglycerides. Following challenge with an enteric pathogen, an increase in neutrophils was observed (in both pigs and mice) and IL-la (mice). Administration of the *Enterobacter cloacae* strain JD6301 would appear to have to be continuous during susceptible periods of time, since the bacteria JD6301 did not appear to colonize in the GI tract. FIG. 22 shows and test results indicated that utilization of the composition and methodology of the invention resulted in poultry that received the bacterial strain JD6301 showed increased serum triglycerides compared to PBS controls. These and other related results show that the invention provides benefits to poultry as well, where the novel strains can pass through the GI tract of poultry, as well as providing clearance of *Salmonella* in swine.

These data indicate that lipid-producing bacteria such as *Enterobacter cloacae* JD6301 and/or JD8715 can be used to provide an available source of utilizable lipids by weanling pigs, which can improve the metabolic (including immune) response of the animals during illness and stressful periods that are accompanied by reduced feed intake during transitional periods. This is the first data to demonstrate the potential use of a non-pathogenic bacterium to improve the energy available to an animal and also improve clearance of pathogens from the host.

Livestock and swine industries, and/or feed and feed supplement companies and feed or nutritional production industries, would benefit from the present invention for at least two reasons. First, the invention could provide a means to increase the resistance of livestock and weanling swine (or other animals during periods of stress such as weaning, transportation, commingling, etc.) to pathogens and associated disease by providing an alternative energy source, which in turn could relate to increased viability during periods where a majority of income loss is observed by producers. Providing an additional low-cost endogenous energy source during these stressful periods of animal, livestock, and swine production will result in increased growth, improved health, and reduced morbidity and mortality. Morbidity and mortality associated with periods of stress within the animal, livestock, and swine industries is a major source of economic loss for producers. For example, bovine respiratory disease has been reported to cost cattle producers more than $750 million annually and can be linked to the stress associated with transportation and commingling of cattle. Second, this microbe could also be fed as a supplementation to animals such as livestock and swine as a means to decrease the amount of feed needed to achieve body growth, thereby improving feed efficiency and reducing input costs.

The invention and its application to animal feeds would provide a low-cost energy source for animals during periods of nutritional restriction, i.e, during periods of weaning, disease, and stress-induced anorexia, for example. Target animals could be weanling pigs, dairy calves, and feedlot receiving calves. Feed supplements utilizing the invention could provide an excellent energy source to animals during periods of negative energy balance, such as early lactating dairy cattle. Further, supplements based on the invention can be used strategically to keep or maintain animal energy levels up while overall gut fill is down for specific management systems, such as for periparturient sows and heat-stressed cattle, for example. The invention is likewise applicable to feed supplement enhancement as an energy source prior to animal surgeries, since animals and pets are often food-restricted for at least 12 hours prior to surgery, and could expedite recovery from surgery. Moreover, nutritional feed supplements using the invention could be used as a low-cost fat source for animal and pet foods to improve hair coat, joint mobility, and reduction of fecal output, for example. The invention could likely be used to nutritionally enhance food for humans as well, such as for energy supplementation for malnourished or anorexic individuals and/or patients. Such enhanced food supplements could be an ideal energy source prior to human surgery, since patients are often food-restricted at least 24 hours prior to surgery, and could also help expedite recovery from surgery. This novel invention is distinguishable from the inclusion of probiotics only in diet, since the microbe(s) used in the present invention specifically provides lipids to the animals and has been shown to increase the circulating triglycerides in animals such as swine and mice.

The methodology of distributing the microbes (i.e. packaging) can vary from supplementing animal diets with lyophilized bacteria (the most likely packaging method of choice) to utilizing fresh cultures similar to that utilized in the inventors' studies. The methodology of the invention includes utilizing the oral supplement compositions of the invention as dry, liquid, and/or water-based supplements, or a combination thereof. The compositions and methodology of the invention may consist of an animal feed, a drink, a dairy product, a juice, a soup, a human food, or any combination thereof, for example. The administration of the oral supplement compositions to the animal in need can be by feeding the animal, either passively or actively, via a delivery media that is an orally ingestible solid or liquid or some suitable combination.

The above detailed description is presented to enable any person skilled in the art to make and use the invention. Specific details have been revealed to provide a comprehensive understanding of the present invention, and are used for explanation of the information provided. These specific details, however, are not required to practice the invention, as is apparent to one skilled in the art. Descriptions of specific applications, analyses, and calculations are meant to serve only as representative examples. Various modifications to the preferred embodiments may be readily apparent to one skilled in the art, and the general principles defined herein may be applicable to other embodiments and applications while still remaining within the scope of the invention. There is no intention for the present invention to be limited to the embodiments shown and the invention is to be accorded the widest possible scope consistent with the principles and features disclosed herein.

While various embodiments of the present invention have been described above, it should be understood that they have been presented by way of example and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. Thus, the present invention should not be limited by any of the above-described exemplary embodiments.

The compositions, processes, methods, and system of the present invention are often best practiced by empirically determining the appropriate values of the operating parameters, or by conducting simulations to arrive at best design for a given application. Accordingly, all suitable modifications, combinations, and equivalents should be considered as falling within the spirit and scope of the invention.

TABLE 1

| GENE | FUNCTION |
| --- | --- |
| Diglyceride acyltransferase 2 (DGAT2) | Involved in tryglyceride synthesis |
| Apolipoprotein 1 (ApolipoA1) | Major component in high density lipoproteins |
| Insulin-Induced Gene 1 (Insig1) | Regulates homeostasis within adipose tissues |

TABLE 1-continued

| GENE | FUNCTION |
|---|---|
| Lipoprotein lipase (Lipase) | Hydrolyzes triglycerides into monoglycerides and fatty acids |
| Beta-actin | Housekeeping gene |

TABLE 2

| | Fold Changes | | |
|---|---|---|---|
| Gene | Day 1 | Day 2 | Day 3 |
| DGAT2 | 1.18 | 1.48 | −7.69 |
| ApolipoA1 | 5.37 | 1.84 | −1.41 |
| Insig 1 | 8.68 | 1.20 | −12.5 |
| Lipase | −2.38 | −1.56 | −2.00 |

Fold changes in expression of DGAT2, ApolipA1, Insig 1, and Lipoprotein lipase (lipase) on days 1, 2, and 3 post-challenge in pigs provided *Enterobacier cloacae* strain JD6301. Fold changes were calculated using the $2^{-\Delta\Delta Ct}$ method. The data was normalized to the internal control gene beta-actin. Fold changes between experimental and PBS samples are shown.

TABLE 3

| | Fold Changes | | |
|---|---|---|---|
| Gene | Day 1 | Day 2 | Day 3 |
| DGAT2 | 1.20 | 2.75 | −2.39 |
| ApolipoA1 | 3.88 | −1.05 | −2.27 |
| Insig 1 | 9.41 | −1.43 | −16.67 |
| Lipase | 1.82 | −2.50 | −9.09 |

Fold changes in expression of DGAT2, ApolipA1, Insig 1, and Lipoprotein lipase (lipase) on days 1, 2, and 3 post-challenge in pigs provided *Enterobacter cloacae* strain JD8715. Fold changes were calculated using the $2^{-\Delta\Delta Ct}$ method. The data was normalized to the internal control gene beta-actin. Fold changes between experimental and PBS samples are shown.

REFERENCES

Alvarez, H M and A Steinbuchel, 2002. Triacylglycerols in prokaryotic microorganisms. Applied Microbiology Biotechnology, 60, pp. 367-376.

Donaldson, J R, S Shields-Menard, J M Bernard, E Revellame, J I Hall, A Lawerence, J G Wilson, A Lipzen, J Martin, W Schackwitz, T Woyke, N Shapiro, K S Biddle, W E Holmes, R Hernandez, and W T French. 2014. Characterization of the novel *Enterobacter cloacae* strain JD6301 and a genetically modified variant capable of producing extracellular lipids. Agriculture, Food, and Analytical Bacteriology, 4, pp. 212-223.

Holder, J W, J C Ulrich, A C DeBono, P A Godfrey, C A Desjardins, J Zucker, Q Zeng, A L Leach, I Ghiviriga, C Dancel, T Abeel, D Gevers, C D Kodira, B Desany, J P Affourtit, B W Birren, and A J Sinskey. 2011. Comparative and functional genomics of *Rhodococcus opacus* PD630 for biofuels development. PLoS Genetics. 7, e 1002219.

Meng, X, X Yang, L Xu, L Zhang, Q Nie, and M Xian. 2009. Biodiesel production from oleaginous microorganisms. Renewable Energy, 34, pp. 1-5.

Ranganathan, S V, S L Narasimban, and K Muthukumar. 2008. An overview of enzymatic production of biodiesel. Bioresources Technology. 99, pp. 3975-3981.

Rosen, E D and B M Spiegelman, 2006. Adipocytes as regulators of energy balance and glucose homeostasis. Nature. 444, pp. 847-853.

Wynn, J P and C Ratledge. 2005. Oils from microorganisms. In Bailey's Industrial Oil and Far Products. Shahidi F, ed. (Wiley and Sons, Inc).

What is claimed is:

1. A method of improving the nutritional supplementation profile of an animal in need thereof, the method comprising:
    forming an oral supplement composition comprising a delivery media combined with at least one oleaginous microorganism;
    administering said oral supplement composition to the animal in an amount effective to improve the nutritional supplementation profile in the animal, wherein the oral supplement composition comprises at least about 20% of its cellular weight as lipid; and
    increasing a level of circulating triglycerides of the animal through the administration of the composition to the animal to enhance an immunity response of the animal, and
    wherein the nutritional supplementation includes nutritional, energy, or immune system supplementation, or a combination thereof, for the animal and
    wherein the at least one oleaginous microorganism is enteric bacteria *Enterobacter cloacae* strain JD6301, *Enterobacter cloacae* strain JD8715, or a combination thereof.

2. The method of claim 1, wherein the delivery media is an orally ingestible solid, liquid, or combination thereof.

3. A method of increasing triacylglyceride concentration and improving the nutritional supplementation profile of an animal in need thereof, the method comprising:
    forming an oral supplement composition comprising a delivery media combined with at least one oleaginous microorganism; and
    administering said oral supplement composition to the animal in an amount effective to improve the nutritional supplementation profile in the animal, wherein the oral supplement composition comprises at least about 20% of its cellular weight as lipid,
    wherein the nutritional supplementation includes nutritional, energy, or immune system supplementation, or a combination thereof, for the animal, and
    wherein the at least one oleaginous microorganism is enteric bacteria *Enterobacter cloacae* strain JD6301, *Enterobacter cloacae* strain JD8715, or a combination thereof.

4. The method of claim 3, wherein the delivery media is an orally ingestible solid, liquid, or combination thereof.

* * * * *